United States Patent
Couleaud et al.

(10) Patent No.: US 10,306,294 B2
(45) Date of Patent: May 28, 2019

(54) USER CENTRIC ADAPTATION OF VEHICLE ENTERTAINMENT SYSTEM USER INTERFACES

(71) Applicant: Thales Avionics, Inc., Irvine, CA (US)

(72) Inventors: Jean-Yves Couleaud, Mission Viejo, CA (US); Tracy Decuir, Yorba Linda, CA (US)

(73) Assignee: Thales Avionics, Inc., Irvine, CA (US)

( * ) Notice: Subject to any disclaimer, the term of this patent is extended or adjusted under 35 U.S.C. 154(b) by 0 days.

(21) Appl. No.: 15/864,535

(22) Filed: Jan. 8, 2018

(65) Prior Publication Data

US 2018/0131992 A1 May 10, 2018

Related U.S. Application Data

(63) Continuation of application No. 14/751,963, filed on Jun. 26, 2015.

(51) Int. Cl.

| | |
|---|---|
| *H04N 21/431* | (2011.01) |
| *H04N 21/214* | (2011.01) |
| *H04N 21/45* | (2011.01) |
| *H04N 21/485* | (2011.01) |
| *H04N 7/18* | (2006.01) |
| *H04H 20/62* | (2008.01) |
| *H04N 21/4223* | (2011.01) |

(Continued)

(52) U.S. Cl.
CPC ..... *H04N 21/4316* (2013.01); *G06K 9/00268* (2013.01); *G06K 9/00302* (2013.01); *G06K 9/00315* (2013.01); *G06K 9/00832* (2013.01); *H04H 20/62* (2013.01); *H04H 60/33* (2013.01); *H04H 60/65* (2013.01); *H04N 7/183* (2013.01); *H04N 21/2146* (2013.01); *H04N 21/25883* (2013.01); *H04N 21/41422* (2013.01); *H04N 21/4223* (2013.01); *H04N 21/42201* (2013.01); *H04N 21/4532* (2013.01); *H04N 21/4668* (2013.01); *H04N 21/4825* (2013.01); *H04N 21/4858* (2013.01); *H04N 21/812* (2013.01)

(58) Field of Classification Search
CPC . G06F 21/32; G06F 3/04895; H04N 21/2146; H04N 21/4312; H04N 21/4314; H04N 21/4316; H04N 21/44222; H04N 21/4532; H04N 21/4858
See application file for complete search history.

(56) References Cited

U.S. PATENT DOCUMENTS

| | | | |
|---|---|---|---|
| 5,715,415 A | 2/1998 | Dazey et al. | |
| 2006/0184800 A1* | 8/2006 | Rosenberg | G06F 21/32 713/186 |

(Continued)

*Primary Examiner* — Hai V Tran
(74) *Attorney, Agent, or Firm* — Sage Patent Group

(57) ABSTRACT

A vehicle entertainment system includes a video display unit and a user interface (UI) control processor. The UI control processor is configured to receive passenger attributes sensed from the passenger operating the video display unit, generate a passenger metric that characterizes the passenger based on the attribute, and control a UI of the video display unit based on the passenger metric. The passenger metric may be a passenger demographic metric determined based on facial features of the passenger. The passenger demographic metric may be a passenger emotion metric, a passenger attentiveness metric, a passenger UI operational effectiveness metric, a passenger biometric feature metric, etc.

20 Claims, 7 Drawing Sheets

(51) Int. Cl.
*G06K 9/00* (2006.01)
*H04N 21/258* (2011.01)
*H04N 21/422* (2011.01)
*H04N 21/482* (2011.01)
*H04N 21/466* (2011.01)
*H04N 21/81* (2011.01)
*H04N 21/414* (2011.01)
*H04H 60/33* (2008.01)
*H04H 60/65* (2008.01)

(56) References Cited

U.S. PATENT DOCUMENTS

| | | | |
|---|---|---|---|
| 2009/0138805 A1* | 5/2009 | Hildreth | G06K 9/00335 715/745 |
| 2010/0131983 A1* | 5/2010 | Shannon | H04N 5/44543 725/46 |
| 2012/0083668 A1* | 4/2012 | Pradeep | A61B 5/04015 600/300 |
| 2013/0063612 A1* | 3/2013 | Royster | H04N 21/2146 348/207.99 |
| 2014/0026156 A1* | 1/2014 | Deephanphongs | H04N 21/25866 725/12 |

* cited by examiner

USER CENTRIC ADAPTATION OF VEHICLE ENTERTAINMENT SYSTEM USER INTERFACES

CROSS REFERENCE TO RELATED APPLICATION

This application is a continuation of U.S. patent application Ser. No. 14/751,963, filed Jun. 26, 2015, which is hereby incorporated by reference in its entirety for all purposes.

TECHNICAL FIELD

Embodiments described herein relate generally to electronic entertainment systems and, more particularly, to man-machine interfaces for controlling vehicle and other entertainment systems.

BACKGROUND

In-flight entertainment (IFE) systems are deployed onboard aircraft to provide entertainment for passengers in a passenger cabin. IFE systems typically provide passengers with television, movies, games, audio entertainment programming, and other content.

IFE systems typically provide a Graphical User Interface (GUI) on an in-seat Video Display Unit (VDU) that can include an interactive touch selection interface. The GUI includes graphical elements that can include buttons, text, icons, and images. A user can touch select a displayed graphical element to initiate an action or navigate to another layer of graphical elements associated with the selected graphical element.

Designers invest significant time and effort into producing a GUI that is both intuitive and efficient for a typical passenger to use. Once the layout of graphical elements and the interconnect of graphical elements on different hierarchical layers is selected, the GUI is programmatically implemented to provide a same interface on all VDUs within an aircraft and across all aircraft using that type of VDU.

Passenger satisfaction with a flight experience and, ultimately, with an airline can be significantly impacted by the assumptions made by the designers during the layout and configuration design for the GUI of VDUs for an IFE system.

SUMMARY

Some embodiments of the present disclosure are directed to a vehicle entertainment system that includes a video display unit and a user interface (UI) control processor. The UI control processor is configured to receive passenger attributes sensed from the passenger operating the video display unit, generate a passenger metric that characterizes the passenger based on the attribute, and control a UI of the video display unit based on the passenger metric. The vehicle entertainment system may be an in-flight entertainment system configured to be mounted within an aircraft fuselage.

As will be explained in detail below in the context of numerous example embodiments, the UI can be controlled responsive to the passenger's demographics which are sensed via a camera, responsive to the passenger's emotions, responsive to the passenger's attentiveness, the determined passenger's UI operational effectiveness, etc.

Other vehicle entertainment systems and methods according to embodiments of the invention will be or become apparent to one with skill in the art upon review of the following drawings and detailed description. It is intended that all such additional vehicle entertainment systems and methods be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiments of the invention. In the drawings.

DETAILED DESCRIPTION

The following detailed description discloses various non-limiting example embodiments of the invention. The invention can be embodied in many different forms and is not to be construed as limited to the embodiments set forth herein.

Various embodiments of the present disclosure may arise from the present realization that providing a same fixed user interface (UI) to all passengers may satisfy some passengers, but will not sufficiently satisfy all passengers. As passengers have become more sophisticated in their preferences, such a one-size-fits-all approach to UI layout and operation is not an optimal approach for achieving passenger satisfaction. Some passengers have a high level of computer sophistication and are more likely to desire increased complexity UIs that provide expanded capability and passenger-interaction efficient functionality. In sharp contrast, some other passengers have a lower level of computer sophistication and are more likely to desire less complex more intuitive UIs that may exhibit less passenger-interaction efficient functionality but provide greater guidance through more UIs queries and passenger responses to perform functionality.

In accordance with various embodiments disclosed herein, an IFE system is provided that includes a UI control processor that obtains attributes of an individual passenger, generates passenger metrics that characterize the individual passenger, and controls the UI of a video display unit (VDU) used by that individual passenger based on the passenger metrics.

Figure 1:
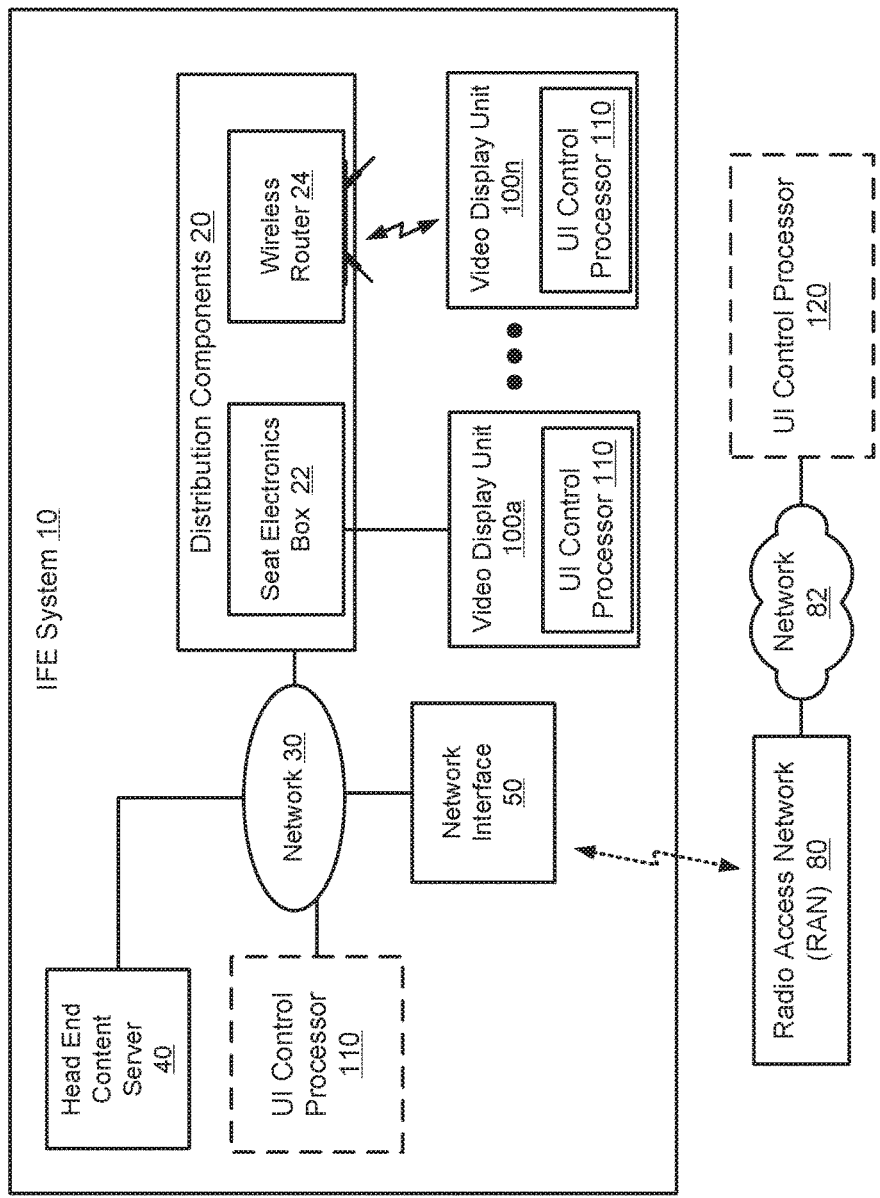
FIG. 1 illustrates a block diagram of an in-flight entertainment system that generates passenger metrics which are used to control the user interface of a video display unit (VDU) according to some embodiments.

FIG. 1 is a block diagram of an IFE system 10 that includes video display units (VDUs) 100a-n, a head end content server 40, and distribution components 20. The system 10 further includes a UI control processor 120 that may reside at least partially within each VDU 100, reside at least partially within another component of the IFE system 10 separate from the VDU 100 (e.g., within the head end content server 40 or elsewhere), and/or reside at least partially off-board the aircraft such as on a land based server. The UI control processor 120 may, for example, be incorporated within a land based server that is communicatively connected through a data network 82 (e.g., private or public network, such as the Internet), a Radio Access Network 80 (e.g., satellite communication system transceiver and/or cellular communication system transceiver) to a wireless transceiver of a network interface 50 to communicate with the VDUs 100.

Figure 2:
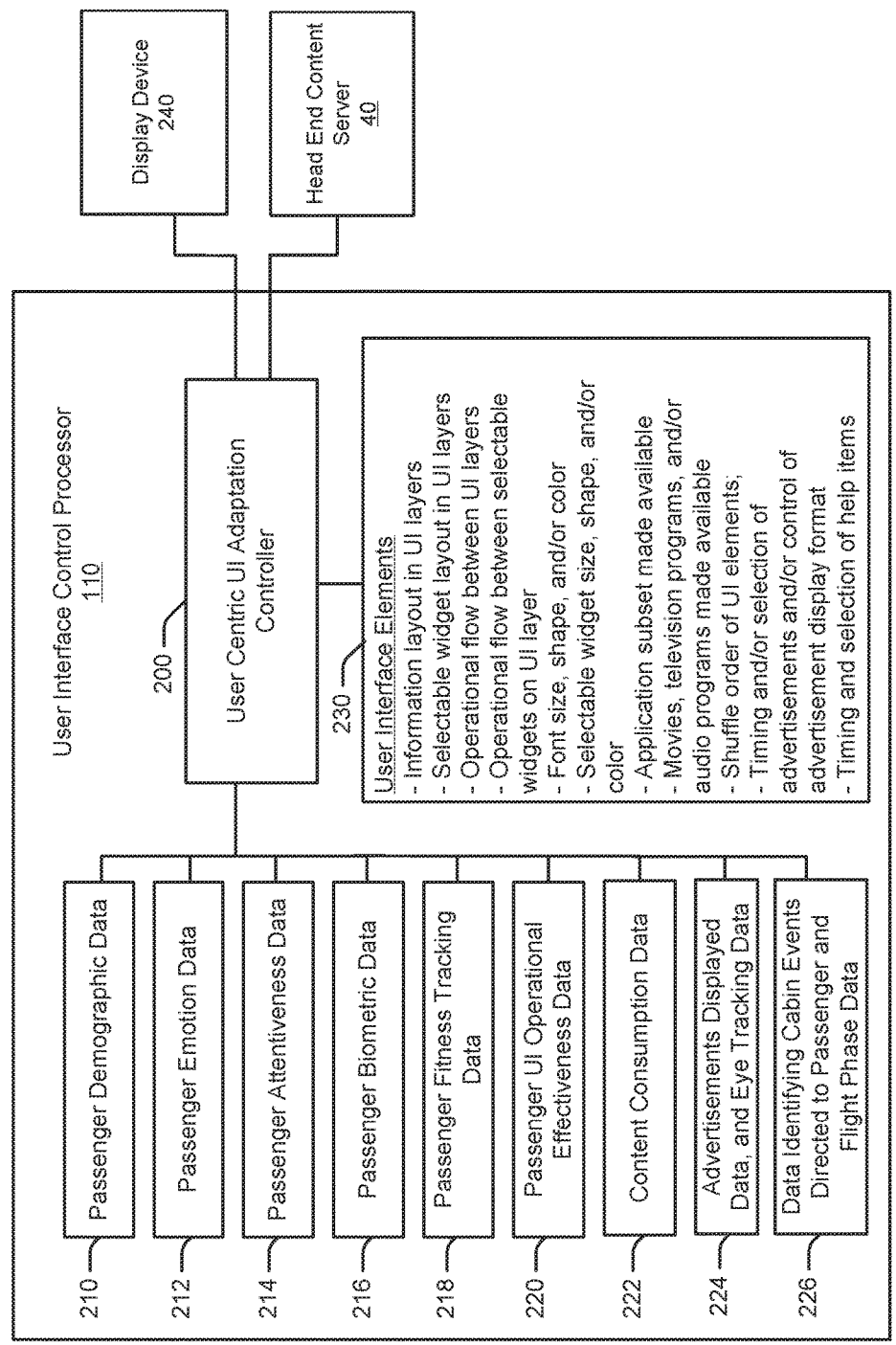
FIG. 2 illustrates example information and operations used to characterize a passenger and example operations performed to control the UI of a VDU according to some embodiments.
Figure 3:
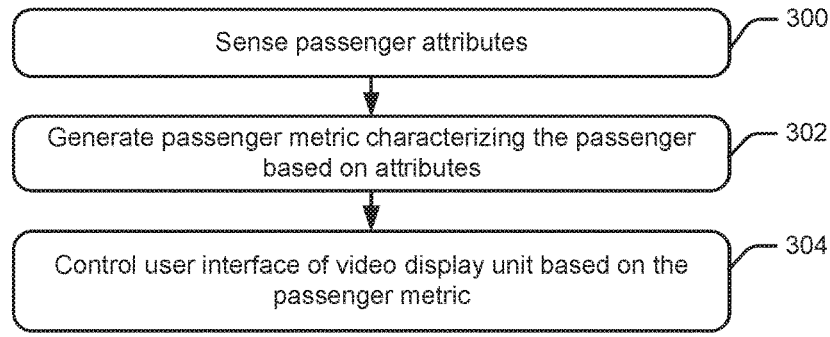
FIGS. 3-10 illustrate flowcharts of operations and methods that may be performed by a processor of a VDU, another component of the IFE, and/or a component off-board the aircraft to characterize a passenger and example operations performed to control the UI according to some embodiments.

FIG. 3 illustrates operations and methods that may be performed at least in part by the UI control processor 120. Referring to FIGS. 1 and 3, the UI control processor 120 receives (block 300) passenger attributes have been sensed. Various approaches for sensing and identifying passenger attributes are described in detail regarding FIGS. 2 and 4-11. The UI control processor 120 generates (block 302) a passenger metrics characterizing the passenger based on the attributes, and controls the UI of one of the VDUs 100 which is being operated by that passenger, based on the passenger metrics.

The head end content server 40 stores a set of content and is configured to separately deliver content to the VDUs 100a-n responsive to content selection commands separately received from the VDUs 100a-n through a data network 30 and the distribution components 20. The distribution components 20 may include seat electronics boxes 22, each of which can be spaced apart adjacent to different groups of seats, and/or one or more wireless communication routers 24.

Example content that can be provided by the head end content server 10 to selected ones of the VDUs 100a-n can include, but is not limited to, movies, TV programs, audio programs, application programs (e.g. games, news, etc.), informational videos and/or textual descriptions (e.g., regarding destination cites, services, and products), and advertisements. The wireless router 24 may be a WLAN router (e.g. IEEE 802.11, WIMAX, etc), a cellular-based network (e.g. a pico cell radio base station), etc.

The VDUs 100a-n are connected to the head end content server 40 to request and receive content through wired and/or wireless network connections through the network 30 and/or the distribution components 20. Although only three VDUs 100a-100n and one content server 10 are shown in FIG. 1 for ease of illustration, any number of VDUs and content servers may be used with embodiments herein. Functionality described herein as being performed by the UI control processor 120 may actually be performed in part by more than one UI control processor and may involve other components, such as sensors which sense passenger attributes, personal devices of the passengers which they have carried on-board the aircraft, etc.

Although the system of FIG. 1 includes a head end content server 40, the vehicle entertainment systems disclosed herein are not limited thereto. The video display units 100a-100n may alternatively be configured to store content in internal/local mass memory for access by users and/or may stream and/or download content from other devices, such as from other video display units (e.g., peer-to-peer sharing) and/or from off-board devices such as ground based content servers accessed via a satellite and/or cellular communication system.

Although embodiments herein are primarily described in the context of an IFE system within an aircraft cabin, the invention is not limited thereto. Instead, the embodiments may be used to provide other types of vehicle entertainment systems for trains, automobiles, cruise ships, buses, and other vehicles. When used in an aircraft, a bus, a train, or other vehicles where seats are arranged in columns, the VDUs 100a-n can be attached to seatbacks so they face passengers/users in adjacent rearward seats. The VDUs 100a-n may alternatively be mounted to bulkheads, movable support assemblies connected to seat armrests and/or seat frames, etc. Embodiments herein may be used with vehicle electronic systems other than entertainments system, such as with vehicle digital signage display systems, etc.

FIG. 2 illustrates example information and operations used to characterize a passenger and example operations performed to control the UI of a VDU according to some embodiments. Referring to FIG. 2, as will be explained in further detail below, the UI control processor 110 includes a user centric UI adaptation controller 200 that controls user interface elements 230 displayable on a display device 240 of the VDU 100 and/or controls content from the head end content server 40 based on passenger attribute data that is sensed by electronic sensors and characterizes one or more attributes of the passenger. The passenger attribute data can include, but is not limited to, one or more of the following: passenger demographic data 210, passenger emotion data 212, passenger attentiveness data 214, passenger biometric data 216, passenger fitness tracking data 218, passenger UI operational effectiveness data 220, content consumption data 222, displayed advertisements data 224 which may include passenger eye tracking data, and data identifying cabin events directed to the passenger and/or flight phase data 226.

The UI adaptation controller 200 controls or adapts the UI elements so that they are more optimized for use by the passenger responsive to the passenger attribute data characterizing the passenger. As will be explained in further detail below, the user interface elements 230 that can be controlled or adapted can include, but are not limited to, one or more of the following: information layout in UI layers; selectable widget layout in UI layers; operational flow between UI layers; operational flow between selectable widgets in a UI layer; font size, shape, and/or color; selectable widget size, shape, and/or color; applications made available through the VDU; movies, television programs and/or audio programs made available through the VDU, shuffled order of UI elements display; timing and/or selection of advertisements and/or advertisement display format; timing and/or selection of help items.

Figure 4:
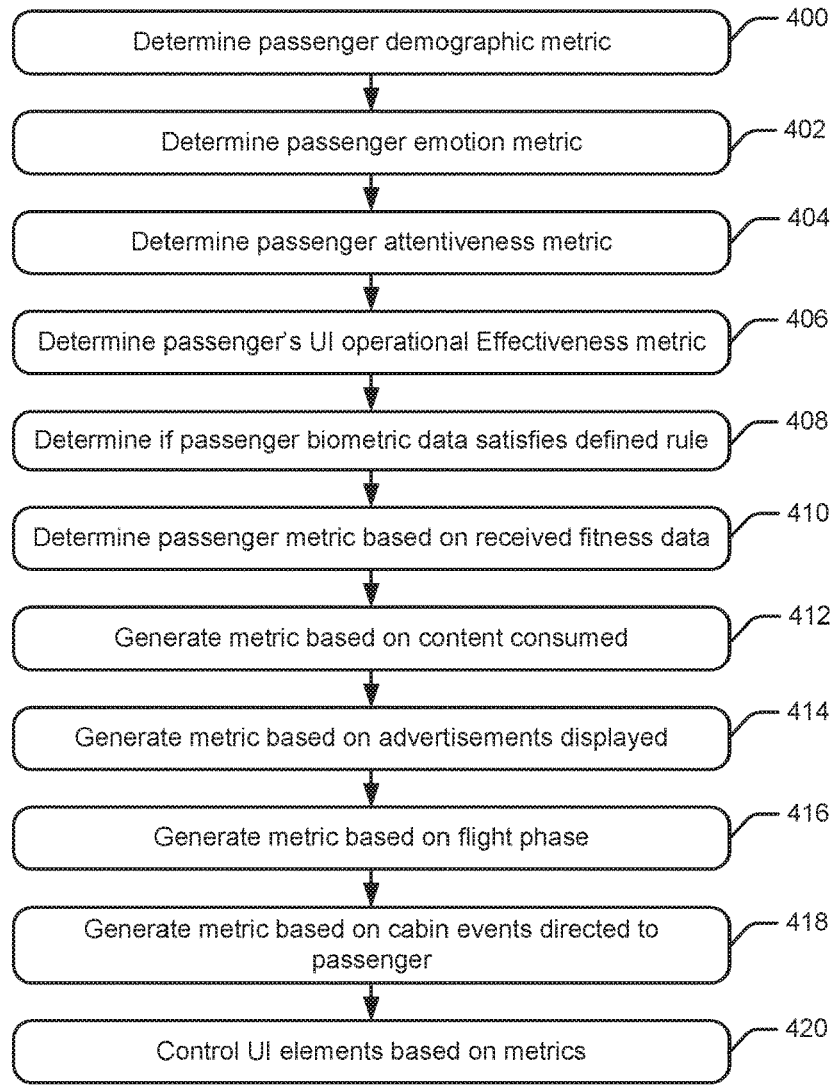

FIG. 4 illustrates further operations that may be performed by the UI control processor 110, e.g., via the user centric UI adaptation controller 200, to generate passenger metrics that can be used to control one or more of the UI elements. Although FIG. 4 illustrates a sequence of operations it is to be understood that the UI control processor 110 may be configured to perform only one of the operations, to perform a plurality of operations and select among the plurality based on the passenger metrics and/or based on a defined rule which may respond to a defined event occurring at the time.

Figure 5:
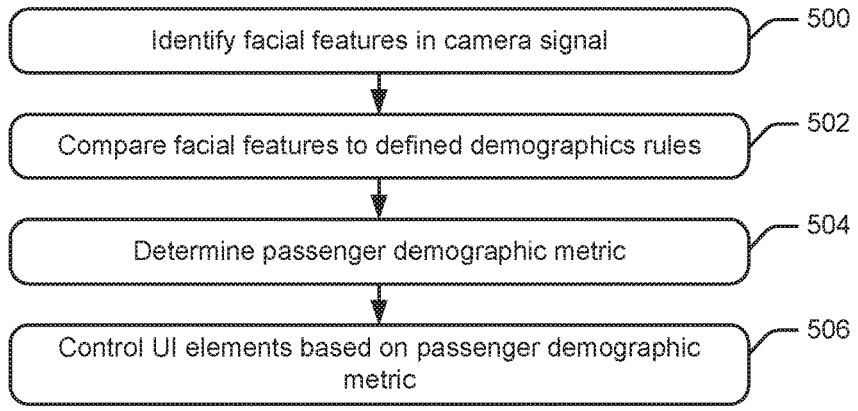

Referring to FIG. 4, the operations may include determining (block 400) a passenger demographic metric based on the passenger data. In one nonlimiting example approach, the controller 200 may analyze the camera signal to estimate the passenger's age based on hair color, sensed facial wrinkles or skin tightness, complexion, height, weight, etc. The controller 200 may similarly determine the gender and/or ethnicity of the passenger based on skin color, eye color, etc. In the embodiment of FIG. 5, the VDU 100 includes a camera configured to output a camera signal containing data representing the passenger's face. The UI control processor 110 is configured to process the camera signal to identify (block 500) facial features of the passenger, and compare (block 502) the facial features to defined demographics rules. The UI control processor 110 determines (block 504) a passenger demographic metric based on the comparison of the facial features to the defined demographics rules, and controls (block 506) the UI of the VDU 100 based on the passenger demographic metric.

Figure 6:
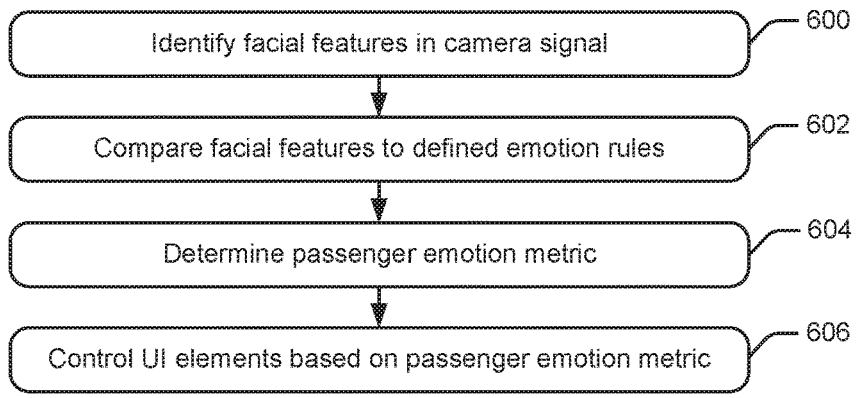

With further reference to FIG. 4, the operations may include determining (block 402) a passenger emotion metric based on the passenger data. In the embodiment of FIG. 6, the UI control processor 110 is configured to process the camera signal to identify (block 600) facial features of the passenger, and compare (block 602) the facial features to defined emotion rules, such as by identifying facial expressions that are compared to the emotion rules. The UI control processor 110 determines (block 604) a passenger emotion metric based on the comparison of the facial features to the defined emotion rules, and controls (block 606) the UI of the VDU 100 based on the passenger emotion metric. The facial analysis operations performed on the camera signal may identify occurrences of facial expressions that are classified based on the emotion rules as being, for example, neutral, smiling, laughing, sad, bored, sleeping, or surprised.

The processor 110 may correlate changes in emotion to a timeline of the content, such as by correlating identified emotions to a timeline of content dialog or scene changes within content. Changes in emotion may be correlated to introduction or removal of advertisements which may be displayed in-line during commercial breaks in the content or displayed in parallel (e.g., within advertisement bars adjacent to the content, within picture-in-picture windows overlaid on the content, etc.) and/or correlated to tracked locations within advertisement dialogs or advertisement scene changes within content. The correlations may be identified by information included in the enhanced content usage metrics. Thus, for example, the UI of the VDU 100 may be controlled based on an average level of happiness, sadness, boredom, surprise, inattentiveness, etc. exhibited by the passenger during identified scenes and/or times within the content.

Figure 7:
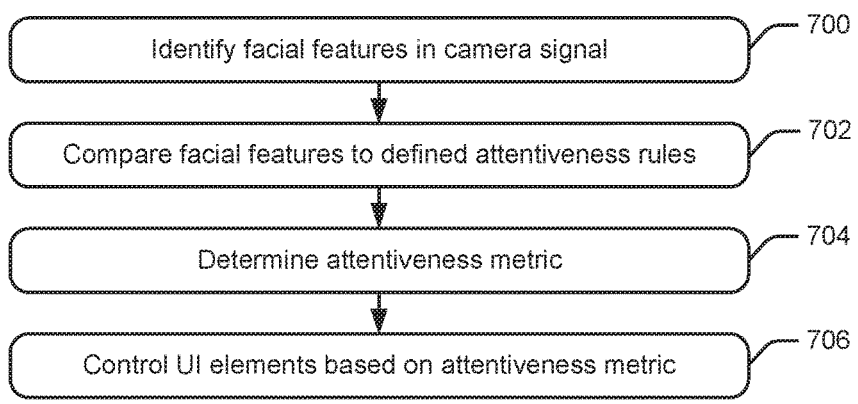

With further reference to FIG. 4, the operations may include determining (block 404) a passenger attentiveness metric based on the passenger data. In the embodiment of FIG. 7, the UI control processor 110 is configured to process the camera signal to identify (block 700) facial features of the passenger, and compare (block 702) the facial features to defined attentiveness rules. The UI control processor 110 determines (block 704) a passenger attentiveness metric based on the comparison of the facial features to the defined attentiveness rules, and controls (block 706) the UI of the VDU 100 based on the passenger attentiveness metric.

Figure 8:
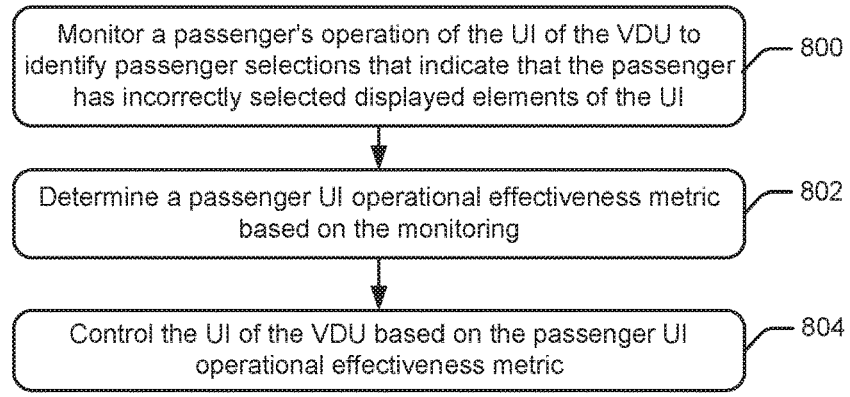
Figure 9:
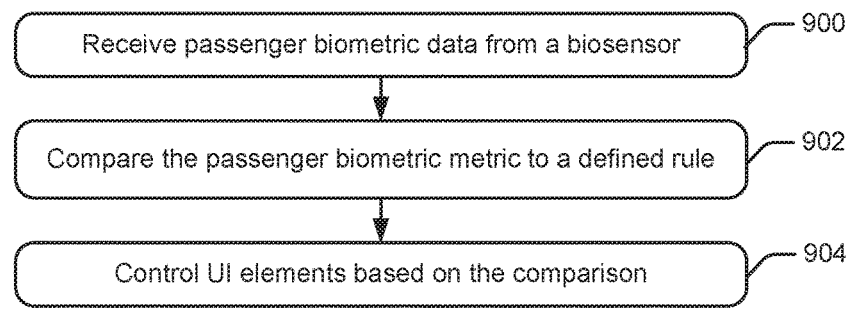

With further reference to FIG. 4, the operations may include determining (block 406) a passenger's UI operational effectiveness metric based on the passenger data. In the embodiment of FIG. 8, the UI control processor 110 is configured to monitor (block 800 a passenger's operation of the UI of the VDU 100 to identify passenger selections that indicate that the passenger has incorrectly selected displayed elements of the UI and/or has selected an ineffective (e.g., inefficient) sequence of displayed elements to perform an operation. A passenger UI operational accuracy metric is determined (block 802) based on the monitoring, and the UI of the VDU 100 is controlled (block 804) based on the passenger UI operational effectiveness metric.

With further reference to FIG. 4, the operations may include determining (block 408) if a passenger's biometric data satisfies a defined rule. In the embodiment of FIG. 8, the UI control processor 110 is configured to receive (block 900) passenger biometric data from a biosensor, compare (block 902) the passenger biometric data to a defined rule, and control (block 904) the UI of the VDU 100 based on the comparison.

Figure 10:
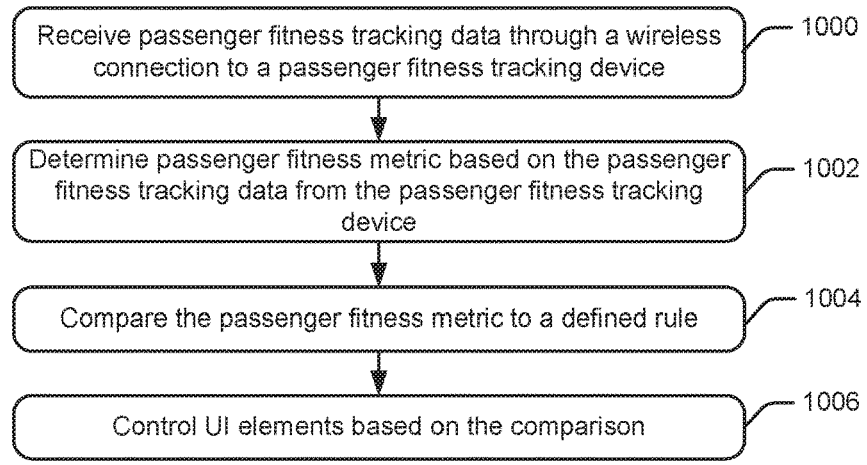

With further reference to FIG. 4, the operations may include determining (block 410) a passenger metric based on fitness data received from the passenger's electronic device. In the embodiment of FIG. 10, the UI control processor 110 is configured to receive (block 1000) passenger fitness tracking data through a wireless connection to a passenger fitness tracking device (e.g., mobile phone, fitness tracking device worn by passenger, etc.). A passenger fitness metric is determined (block 1002) based on the passenger fitness tracking data from the passenger fitness tracking device. The UI control processor 110 can compare the passenger fitness metric to a defined rule, and control (block 1006) the UI of the VDU 100 based on the comparison.

With further reference to FIG. 4, the UI control processor 110 may perform operations to generate (block 412) a passenger metric based on content that has been tracked and determined to have been consumed through the VDU 100. The passenger metric may characterize which content items were consumed during a flight and how much passenger attention was given to various portions of the content items. The passenger metric may be generated (block 414) based on advertisements that have been displayed on the VDU 100, and may be further generated based on tracking where on the display device the passenger has looked and for how long, and if and how long the passenger has looked at the displayed advertisements. The passenger metric may be generated (block 416) based on a present flight phase of the aircraft, and/or may be generated (block 418) based on cabin events (e.g., announcements, food/beverage service, etc.) that are directed to the passenger individually or collectively to the passengers.

Metrics may be generated based on flight phase information, which may include one or more of boarding phase, departure taxi phase, take off phase, cruise phase, landing phase, arrival taxi phase, and disembarking phase. Metrics may be generated based on flight itinerary information, which may include one or more of the departure city, the destination city, departure time, arrival time, and flight duration. Metrics may be generated based on one or more of providing food (e.g., meal and/or beverage) service, crew announcements to passengers, occurrence of aircraft turbulence, and other events that may affect a passenger's attentiveness to information and operational widgets displayed through the UI, and which may affect that ability of the passenger to correctly operate the UI.

The processor 110 can be further configured to process the camera signal to determine an eye viewing location on a display device of the VDU 100, and to correlate the eye viewing location to a timeline of content consumed by the user through the VDU 100. The processor 110 may control the UI based on the correlation of the eye viewing location to the timeline of content consumed by the user through the VDU 100. The processor 110 may identify particular locations within a timeline of the content that triggered changes in passenger emotion, such as laughing, smiling, surprise, etc. The metrics may indicate whether and how long a passenger looked at an advertisement displayed in a border area to a movie, how long a passenger looked at content of the movie and what content, how long the passenger looked elsewhere while the movie was playing and what content was missed, how long a passenger looked at defined items contained within the movie (e.g., products placed within a movie for advertisement), etc, and generate metrics based thereon.

The UI control processor 110 can control (block 420) one or more of the UI elements of the VDU 100 based on one or more of these and/or other metrics.

Figure 11:
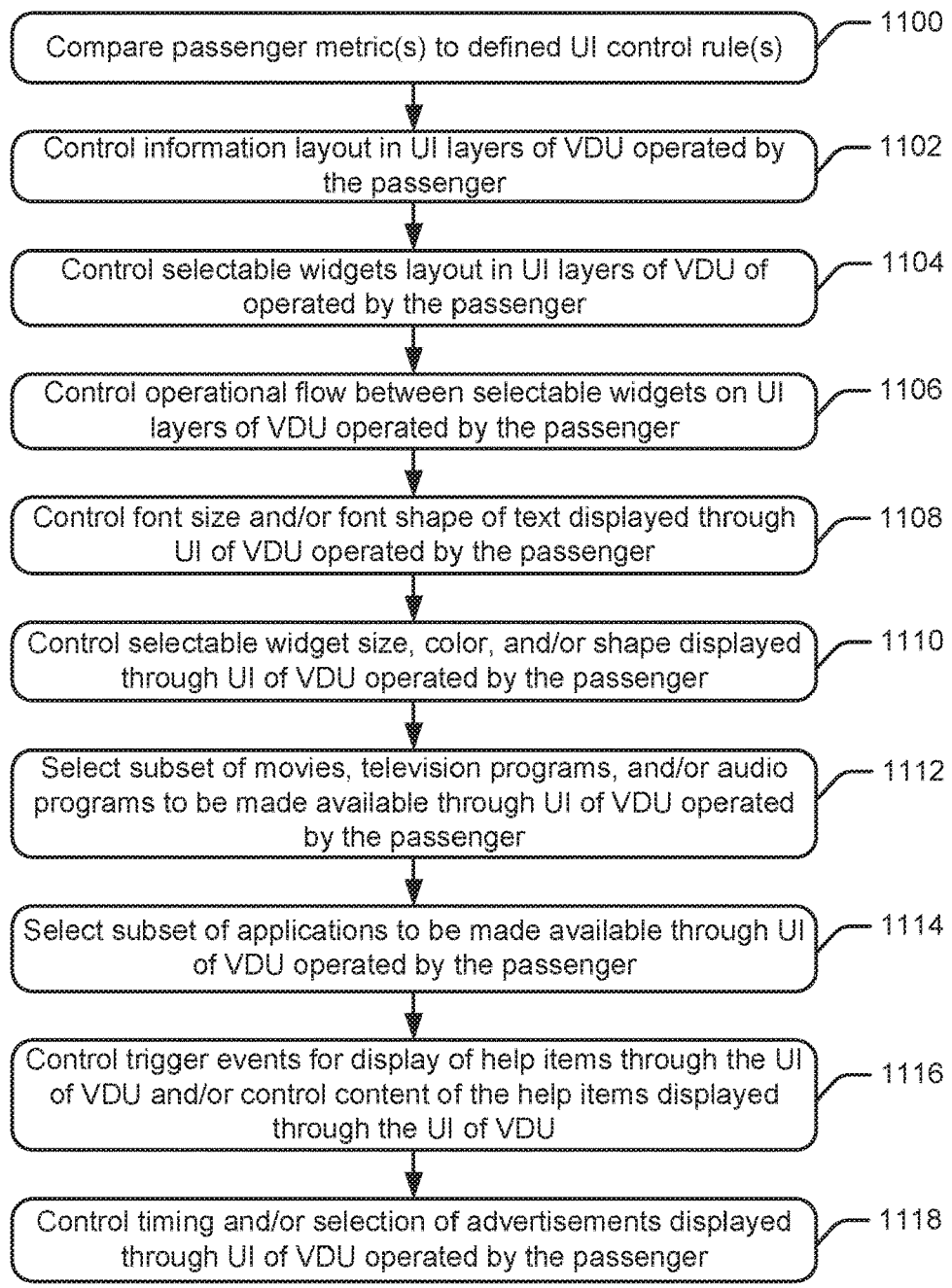
FIG. 11 illustrates a VDU configured according to some embodiments.

In the embodiments of FIG. 11, the UI control processor 110 can compare (block 1100) one or more of the determined passenger metrics to one or more defined rules to determine how to control the UI of the VDU 100. The layout of information in UI layers of the VDU 100 can be controlled (block 1102) based on the comparison. In one embodiment, the UI control processor 110 selects a layout of information for UI layers from among a plurality of different defined layouts of information for UI layers displayable on the VDU 100 based on the passenger metric, and displays the defined layout of information for the UI layers through the UI of the VDU 100.

The layout of selectable widgets in UI layers of the VDU 100 can be controlled (block 1104) based on the comparison. In one embodiment, the UI control processor 110 selects a layout of selectable widgets for a UI layer from among a plurality of different defined layouts of selectable widgets for a UI layer displayable on the VDU 100 based on the passenger metric, and displays the defined layout of selectable widgets for the UI layer through the UI of the VDU 100 operated by that passenger.

The operational flow between UI layers of the VDU 100 can be controlled (block 1106) based on the comparison. In one embodiment, the UI control processor 110 selects an operational flow between passenger selectable widgets of different UI layers from among a plurality of different defined operational flows between passenger selectable widgets of different UI layers displayable on the VDU 100 based on the passenger metric, and controls the operational flow between the passenger selectable widgets of the different UI layers displayed through the UI of the VDU 100 operated by the passenger, based on the operational flow that was selected.

For example, the list of menus and/or operational features presented to passengers and/or content of menus presented for triggering operational flows may be simplified for passengers who are estimated be younger or older than a threshold age. Passengers within a defined age range may be provided more menu options for more advanced functionality and/or provided a greater array of operational features of the video display unit 100, while other passenger outside the defined age range may be precluded from accessing such advanced functionality and/or provided a subset of the array of operational features.

The font size, font shape, and/or color of text displayed through the UI of the VDU 100 operated by the passenger, can be controlled (block 1108) based on the passenger metric. Alternatively or additionally, the size, the shape, and/or the color of passenger selectable widgets displayed through the UI of the VDU 100 operated by the passenger, can be controlled (block 1110) based on the passenger metric.

For example, the processor 110 may determine a size or layout of text and/or passenger selectable widgets to be displayed on the VDU 100 responsive to an estimate of the passenger's age. For example, passengers having an age beyond a threshold value may be displayed text or selectable widgets having a greater minimum size and/or less graphically complex screen layouts than younger passengers, or vice versa. Similarly, passengers who are exhibiting tiredness or inattentiveness may be displayed text or selectable widgets having a greater minimum size than younger passengers and/or less graphically complex screen layouts than passengers not exhibiting those identifiable conditions, or vice versa.

The processor 110 can control what content is offered for consumption through the VDU 100 based on the passenger demographics, passenger emotion, and/or attentiveness. For example, the processor 110 may filter a set of content stored on the content server 10 to generate a filtered list based on the determine user demographics, passenger emotion, and/or attentiveness, and communicate the filtered list of available content to the VDU 100 for display to that passenger. Thus, the content made available to a passenger can be filtered based on an estimate of the passengers age and/or emotion. Passengers who exhibit a threshold level of attentiveness or, alternatively, less than a threshold level of attentiveness, may be provided an expanded variety of content consumed through their respective VDUs 100.

The processor 110 may filter the list of movies, television programs, audio programs, and/or applications to generate a recommended list based on correlating the passenger attributes to historical data indicating the preferences of passengers who have certain determined attributes. Thus, for example, the processor 110 may use a repository of information that identifies various content preferences that have been observed for passengers having identified attributes, to generate a list of movies, television programs, audio programs, and/or applications that are predicted to be preferred by the present passenger based on the present passenger's attributes.

In a related embodiment, the UI control processor is configured to control the UI of the VDU 100 based on the passenger metric by controlling an order with which content is identified in a list based on the passenger metric. The content is available for display through the UI of the VDU 100 responsive to passenger selection among the ordered list of content. At least a portion of the ordered list of content is then displayed through the UI of the VDU 100.

In some embodiments, a subset of movies, television programs, and/or audio programs that are available on the head end content server 40, can be selected (block 1114) to be made available through the UI of the VDU 100 operated by that passenger, based on the passenger metric. In one embodiment, the UI control processor 110 generates a list of movies, television programs, and/or audio programs that are available from the memory within the content server 40 to be displayed through the UI of the VDU, and filters the list of movies, television programs, and/or audio programs based on the passenger metric to generate a filtered list of movies, television programs, and/or audio programs. The processor 110 then displays the filtered list of movies, television programs, and/or audio programs through the UI of the video display unit 100. The filtering may furthermore be based on metadata that has been associated with the content. The metadata may include, but is not limited to, a description of the content, poster art representing the content, etc.

A subset of applications that are available on the head end content server 40, can be selected (block 1114) to be made available through the UI of the VDU 100 for operation upon by a processor of the VDU 100, based on the passenger metric. In one embodiment, the UI control processor 110 generates a list of applications that are available from the memory within the content server 40 to be selectable through the UI of the VDU 100 operated by the passenger for execution by UI control processor 110 or another processor of the VDU 100. The list of applications is filtered based on the passenger metric to generate a filtered list of applications, and the filtered list of applications is displayed through the UI of the VDU 100.

The events that trigger display of help items through the UI of the VDU 100 can be controlled (block 1116) based on the passenger metric. In one embodiment, the UI control processor 110 selects a help item trigger event from among a plurality of different defined help item trigger events based on the passenger metric, and initiates display of a help item through the UI of the VDU 100 operated by the passenger, based on the help item trigger event that was selected becoming satisfied.

The content of the help items displayed through the UI of the VDU 100 is controlled (block 1116) based on the passenger metric. In one embodiment, the UI control processor 110 selects a help content item from among a plurality of different defined help content items based on the passenger metric, and displays the help content item that was selected through the UI of the VDU 100 operated by the passenger.

The timing and/or selection of advertisements for display through the UI the VDU 100 can be controlled (block 1118) based on the passenger metric. In one embodiment, the UI control processor 110 selects an advertisement from among a plurality of different defined advertisement based on the passenger metric, and displays the advertisement that was selected through the UI of the VDU 100.

In another embodiment, the UI control processor 110 selects an advertisement trigger event from among a plurality of different defined advertisement trigger events based on the passenger metric. The UI control processor 110 then initiates display of an advertisement through the UI of the VDU 100 operated by the passenger, based on the advertisement trigger event that was selected becoming satisfied.

Figure 12:
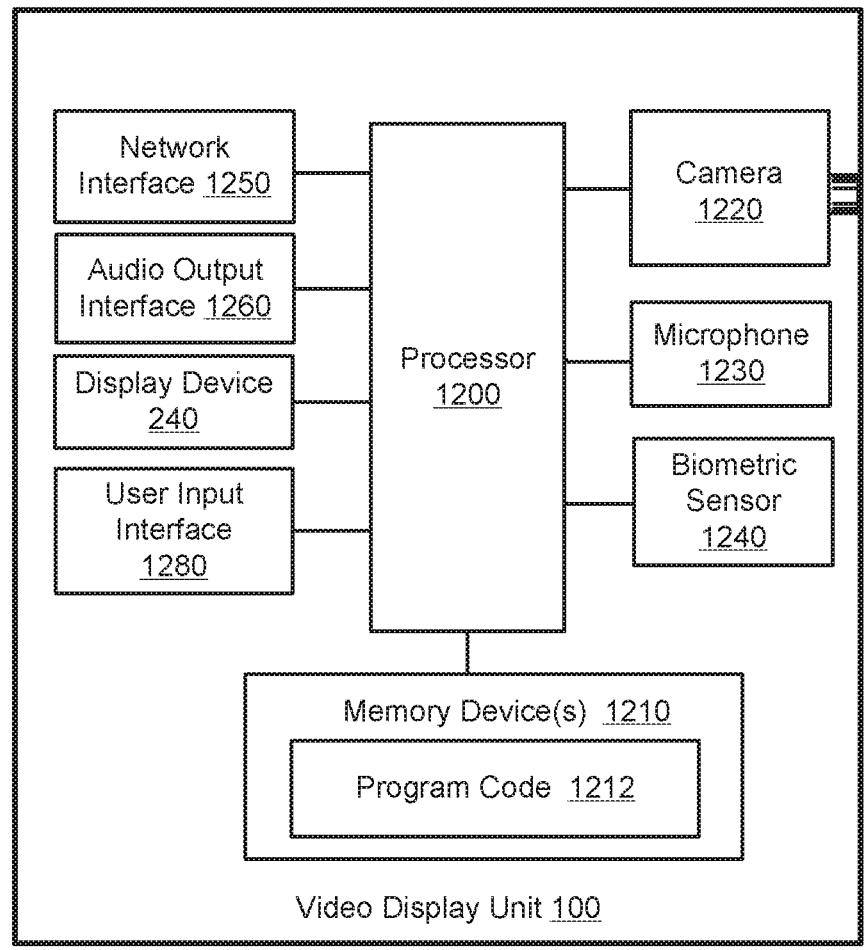
FIG. 12 is a block diagram of components that may be included in the VDU 100 configured to operate according to some embodiments.

FIG. 12 is a block diagram of components that may be included in the VDU 100 configured to operate according to some embodiments. One or more of the components illustrated in FIG. 11 may be included in one or more elements of the system 10 other than the VDU 100, such as within the head end content server 40, a UI control processor 110 that is separate from the VDU 100, or elsewhere. The VDU 100 includes a processor 1200 and a memory 1210 containing program code 1212. The processor 1200 includes one or more data processing circuits, such as a general purpose and/or special purpose processor (e.g., microprocessor and/or digital signal processor). The processor 1200 is configured to execute the program code 1212 in the memory 1210, described below as a computer readable medium, to perform some or all of the operations and methods that are described herein for one or more of the embodiments.

The VDU 100 can include a camera 1220, a microphone 1230, a biometric sensor 1240, a network interface 1250 (e.g., wired or RF wireless communication interface), an audio output interface 1260, a display device 240, and a user input interface 1280 (e.g., touch screen interface, switches, control wheels, buttons, keypad, keyboard, etc.). The camera 1220 is positioned to view a passenger who is operating the VDU 110 and configured to generate a camera signal. The camera 1220 may be any type of sensor that can generate data representing observable characteristics of a passenger. The display device 240 is configured to display images to a passenger and display user selectable widgets (e.g., programmatic soft-buttons, etc.) that the passenger can select to control various functional operations of the IFE system 10.

The processor 1200 processes the camera signal using image detection algorithms (e.g., facial feature expression detection algorithms) and defined rules to identify passenger demographics, passenger emotions, passenger attentiveness, passenger eye viewing locations, and other tracked passenger characteristics, which can be used to generate passenger metrics. The processor 1200 may further operate to track content that was consumed or particular portions of content that was consumed through the VDU 100 by a passenger. The processor 1200 may further operate to correlate the passenger metric(s), e.g., facial expression, mood, attentiveness, etc.) to particular portions of content that is consumed through the video display units 100a-n, and may generate the enhanced content usage metrics based on correlations determined for particular portions of content that was consumed through the video display units 100a-n. As explained above, consumption of content can include viewing the content (e.g., movie, TV program, textual information, informational video), running an application program (e.g., game), listening to audio programming, etc.

The network interface 1250 may connect through a RF transceiver to a fitness tracking device (e.g., mobile phone, fitness tracking device worn by passenger, etc.) carried by the passenger to receive fitness data. The biometric sensor 1140 may be contained within the VDU 100 or may be communicatively connected to the processor 1200 through the network interface 1250. The biometric sensor 1240 may be configured to sense biometric that can include, but is not limited to, passenger's temperature, passenger's heart rate, passenger's respiration rate, passenger's weight, passenger's fingerprint, passenger's iris features, and/or other biometric attributes of the passenger. The biometric sensor 1240 may be contained within a headphone worn by the passenger, contained in an armrest or other seat surface of a seat occupied by the passenger, or be contained or provided by one or more other components of the system 10.

The microphone 1230 may be configured to receive spoken commands from a passenger, which can be interpreted by the processor 1200 to control the UI of the VDU 100. The microphone 1230 may alternatively or additionally be configured to sense ambient noise, such as engine noise and/or announcements in the cabin, and control the UI of the VDU 100. For example, the processor 1200 may pause operation of content being consumed through the display device 240 and/or pause user selectable of the widgets displayed on the display device 240 while an announcement by a crew member is detected through the microphone 1230.

Further Embodiments and Definitions

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-eRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A vehicle entertainment system comprising:
  a video display unit configured to provide content to a passenger of a vehicle comprising the vehicle entertainment system;
  a camera configured to output a camera signal containing data representing viewing location of the passenger's eyes;
  a user interface (UI) control processor configured to:
    process the camera signal to identify how long the passenger's eyes are directed at content displayed on the video display unit;

generate a passenger metric that indicates a level of attentiveness of the passenger to the content displayed by the video display unit based on how long the passenger's eyes are directed at the content displayed on the video display unit and a phase of travel of the vehicle; and control a UI of the video display unit based on the level of attentiveness indicated by the passenger metric and the phase of travel of the vehicle, by operations that comprise:

generating a list of content that is available in a memory to be displayed through the UI of the video display unit operated by the passenger;

filtering the list of content based on the level of attentiveness indicated by the passenger metric and the phase of travel of the vehicle to generate a filtered list of content; and displaying the filtered list of content through the UI of the video display unit.

2. The vehicle entertainment system of claim 1, wherein the UI control processor is configured to control the UI of the video display unit based on the level of attentiveness indicated by the passenger metric, by operations that comprise:

controlling a font size and/or font shape of text displayed through the UI of the video display unit operated by the passenger, based on the level of attentiveness indicated by the passenger metric.

3. The vehicle entertainment system of claim 1, wherein the UI control processor is configured to control the UI of the video display unit based on the level of attentiveness indicated by the passenger metric, by operations that comprise:

controlling a size and/or shape of passenger selectable widgets displayed through the UI of the video display unit operated by the passenger, based on the level of attentiveness indicated by the passenger metric.

4. The vehicle entertainment system of claim 1, wherein the UI control processor is configured to control the UI of the video display unit based on the level of attentiveness indicated by the passenger metric, by operations that comprise:

generating a list of movies, television programs, audio programs, and/or applications that are available from the memory within a content server to be displayed through the UI of the video display unit operated by the passenger;

filtering the list of movies, television programs, audio programs, and/or applications based on the level of attentiveness indicated by the passenger metric to generate a filtered list of movies, television programs, audio programs, and/or applications; and displaying the filtered list of movies, television programs, audio programs, and/or applications through the UI of the video display unit.

5. The vehicle entertainment system of claim 4, wherein filtering the list of movies, television programs, audio programs, and/or applications based on the level of attentiveness indicated by the passenger metric to generate a filtered list of movies, television programs, audio programs, and/or applications, further comprises:

controlling a number of items provided in a recommended list of movies, television programs, audio programs, and/or applications that is displayed on the video display unit to the passenger based on the level of attentiveness indicated by the passenger metric.

6. The vehicle entertainment system of claim 1, wherein the UI control processor is configured to control the UI of the video display unit based on the level of attentiveness indicated by the passenger metric, by operations that comprise:

controlling an order with which content is identified in the list based on the level of attentiveness indicated by the passenger metric, the content being available for display through the UI of the video display unit responsive to passenger selection among the ordered list of content;

displaying at least a portion of the ordered list of content through the UI of the video display unit.

7. The vehicle entertainment system of claim 1, wherein the UI control processor is configured to control the UI of the video display unit based on the level of attentiveness indicated by the passenger metric, by operations that comprise:

selecting an advertisement from among a plurality of different defined advertisement based on the level of attentiveness indicated by the passenger metric; and displaying the advertisement that was selected through the UI of the video display unit.

8. The vehicle entertainment system of claim 1, wherein:

the vehicle comprises an in-flight entertainment system configured to mounted within an aircraft fuselage; and the video display unit is configured to be mounted to a seatback surface of seat or mounted to an armrest of a seat.

9. The vehicle entertainment system of claim 1, wherein the vehicle comprises an aircraft; and wherein the phase of travel comprises one or more of a boarding phase of a flight of the aircraft, a departure taxi phase of a flight of the aircraft, a take off phase of a flight of the aircraft, a cruise phrase of a flight of the aircraft, landing phase of a flight of the aircraft, arrival taxi phrase of a flight of the aircraft, and a disembarking phase of a flight of the aircraft.

10. The vehicle entertainment system of claim 1, wherein the vehicle comprises a cabin; and wherein the user interface (UI) control processor is further configured to generate the passenger metric that indicates the level of attentiveness of the passenger based on a cabin event that occurs with the cabin.

11. The vehicle entertainment system of claim 10, wherein the cabin event is one or more of a meal and/or beverage service provided to the passenger within the cabin, a crew announcement provided to the passenger within the cabin, and a turbulence event experienced by the passenger within the cabin.

12. The vehicle entertainment system of claim 1, wherein the operation of filtering the list of content based on the level of attentiveness indicated by the passenger metric comprises:

determining the passenger metric is less than a threshold level of attentiveness;

responsive to determining the passenger metric is less than the threshold level of attentiveness, expanding the list of content.

13. A vehicle entertainment system comprising:

a video display unit configured to provide content to a passenger of a vehicle comprising the vehicle entertainment system;

a camera configured to output a camera signal containing data representing viewing location of the passenger's eyes;

a user interface (UI) control processor configured to:
  process the camera signal to identify how long the passenger's eyes are directed at content displayed on the video display unit;
  generate a passenger metric that indicates a level of attentiveness of the passenger to the content displayed by the video display unit based on how long the passenger's eyes are directed at the content displayed on the video display unit and a phase of travel of the vehicle; and
  control a UI of the video display unit based on the level of attentiveness indicated by the passenger metric, by operations that comprise:
    selecting an operational flow between passenger selectable widgets of different UI layers from among a plurality of different defined operational flows between passenger selectable widgets of different UI layers displayable on the video display unit based on the level of attentiveness indicated by the passenger metric and the phase of travel of the vehicle; and
    controlling the operational flow between the passenger selectable widgets of the different UI layers displayed through the UI of the video display unit operated by the passenger, based on the operational flow that was selected and the phase of travel of the vehicle.

14. The vehicle entertainment system of claim 13, wherein:
  the vehicle comprises an in-flight entertainment system configured to mounted within an aircraft fuselage; and
  the video display unit is configured to be mounted to a seatback surface of seat or mounted to an armrest of a seat.

15. The vehicle entertainment system of claim 13, wherein the operation of selecting the operational flow from among the plurality of different defined operational flows between passenger selectable widgets of the different UI layers displayable on the video display unit further comprises selecting an operational flow from among the plurality of different defined operational flows that comprises a subset of an array of operational features of the different UI layers.

16. The vehicle entertainment system of claim 13, wherein the operation of selecting the operational flow from among the plurality of different defined operational flows between passenger selectable widgets of the different UI layers displayable on the video display unit further comprises selecting an operational flow from among the plurality of different defined operational flows that comprises an array of advanced operational features of the different UI layers.

17. A vehicle entertainment system comprising:
  a video display unit configured to provide content to a passenger of a vehicle comprising the vehicle entertainment system;
  a camera configured to output a camera signal containing data representing viewing location of the passenger's eyes;
  a user interface (UI) control processor configured to:
    process the camera signal to identify how long the passenger's eyes are directed at content displayed on the video display unit;
    generate a passenger metric that indicates a level of attentiveness of the passenger to the content displayed by the video display unit based on how long the passenger's eyes are directed at the content displayed on the video display unit and a phase of travel of the vehicle; and
    control a UI of the video display unit based on the level of attentiveness indicated by the passenger metric and the phase of travel of the vehicle, by operations that comprise:
      controlling a size and/or shape of passenger selectable widgets displayed through the UI of the video display unit operated by the passenger, based on the level of attentiveness indicated by the passenger metric and the phase of travel of the vehicle.

18. The vehicle entertainment system of claim 17, wherein:
  the vehicle comprises an in-flight entertainment system configured to mounted within an aircraft fuselage; and
  the video display unit is configured to be mounted to a seatback surface of seat or mounted to an armrest of a seat.

19. The vehicle entertainment system of claim 17, wherein the level of attentiveness indicates the passenger is exhibiting inattentiveness towards the content displayed by the video display unit.

20. The vehicle entertainment system of claim 19, wherein the operation of controlling the size and/or shape of passenger selectable widgets displayed through the UI of the video display unit operated by the passenger comprises increasing the size and/or altering the shape of the passenger selectable widgets displayed based on the level of attentiveness indicating the passenger is exhibiting inattentiveness towards the content displayed by the video display unit.

* * * * *